(12) United States Patent
Koda et al.

(10) Patent No.: US 12,508,849 B2
(45) Date of Patent: Dec. 30, 2025

(54) TIRE

(71) Applicant: The Yokohama Rubber Co., LTD., Kanagawa (JP)

(72) Inventors: Hiraku Koda, Kanagawa (JP); Takahisa Murata, Kanagawa (JP); Masatoshi Shimizu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 16 days.

(21) Appl. No.: 18/577,896

(22) PCT Filed: Mar. 22, 2022

(86) PCT No.: PCT/JP2022/013152
§ 371 (c)(1),
(2) Date: Jan. 9, 2024

(87) PCT Pub. No.: WO2023/002701
PCT Pub. Date: Jan. 26, 2023

(65) Prior Publication Data
US 2024/0316993 A1   Sep. 26, 2024

(30) Foreign Application Priority Data
Jul. 20, 2021 (JP) ................ 2021-119858

(51) Int. Cl.
*B60C 15/024* (2006.01)
*B60C 3/04* (2006.01)

(52) U.S. Cl.
CPC .............. *B60C 15/024* (2013.01); *B60C 3/04* (2013.01); *B60C 15/0242* (2013.01)

(58) Field of Classification Search
CPC .................................................. B60C 15/0242
See application file for complete search history.

(56) References Cited

U.S. PATENT DOCUMENTS 6,257,290 B1 * 7/2001 Sakamoto ............... B60C 13/02
152/554
2021/0339579 A1 * 11/2021 Arakawa ............... B60C 15/024

FOREIGN PATENT DOCUMENTS

| JP | H11-34619 A | 2/1999 |
| JP | 2005-238916 A | 9/2005 |
| JP | 2007-118903 A | 5/2007 |
| JP | 2020-15495 A | 1/2020 |
| JP | 2021-54295 A | 4/2021 |

* cited by examiner

*Primary Examiner* — Kendra Ly
(74) *Attorney, Agent, or Firm* — Thorpe North & Western

(57) ABSTRACT

Provided is a tire having a cross-sectional height (SH) ranging from 50 mm to 150 mm, in an unloaded state where the tire is mounted on a specified rim and inflated to a specified internal pressure, an opening distance (A) between the tire and a rim flange on a perpendicular line drawn from an outermost point of the rim flange in a radial direction to an outer surface of the tire with respect to the cross-sectional height (SH) satisfies a relationship 0.01≤A/SH≤0.16 and a projection amount (W) corresponding to one half of a difference between a total width of the tire and a rim width of the specified rim satisfy a relationship 0.03≤A/W≤1.60.

17 Claims, 12 Drawing Sheets

TIRE

TECHNICAL FIELD

The present technology relates to a tire suitable for a case where a high load capacity is required and particularly relates to a tire that enables a failure due to deflection of the tire and a failure due to rubbing between the tire and a rim flange to be effectively reduced and durability to be improved.

BACKGROUND ART

With the increase in vehicle weight due to electrification or the like of automobiles, tires having a high load capacity are awaited. However, the durability of a tire degrades when the deformation repeatedly occurring from a sidewall portion to a bead portion increases during rolling of the tire due to an increase in load.

In contrast, a proposed heavy duty tire improves its durability by specifying the shape of a bead portion with respect to the shape of a rim flange (see, for example, Japan Unexamined Patent Publication No. 11-34619 A). Unfortunately, merely specifying the shape of the bead portion with respect to the shape of the rim flange is insufficient to improve the durability, and there is a concern that a failure due to deflection of the tire and a failure due to rubbing between the tire and the flange may still occur.

SUMMARY

The present technology provides a tire that enables a failure due to deflection of the tire and a failure due to rubbing between the tire and a rim flange to be effectively reduced and durability to be improved.

A tire according to an embodiment of the present technology has a cross-sectional height SH ranging from 50 mm to 150 mm. In an unloaded state where the tire is mounted on a specified rim and inflated to a specified internal pressure, an opening distance between the tire and a rim flange on a perpendicular line drawn from an outermost point of the rim flange in a radial direction to an outer surface of the tire is defined as A, and the opening distance A with respect to the cross-sectional height SH satisfies a relationship $0.01 \leq A/SH \leq 0.16$, and a projection amount corresponding to one half of a difference between a total width TW of the tire and a rim width DW of the specified rim is defined as W, and the opening distance A with respect to the projection amount W satisfies a relationship $0.03 \leq A/W \leq 1.60$.

As a result of the diligent research on the behavior of a bead portion of a tire for a passenger vehicle having a cross-sectional height SH ranging from 50 mm to 150 mm, the present inventors have found that the cross-sectional height SH of the tire and the projection amount W corresponding to one half of the difference between the total width TW of the tire and the rim width DW of the specified rim greatly affects deflection of the tire and that appropriately specifying the opening distance A between the tire and the rim flange with respect to the cross-sectional height SH and the projection amount W effectively reduces a failure due to deflection of the tire and a failure due to rubbing between the tire and the flange to achieve the present technology.

In other words, according to an embodiment of the present technology, in an unloaded state where the tire is mounted on the specified rim and inflated to the specified internal pressure, the opening distance between the tire and the rim flange on the perpendicular line drawn from the outermost point of the rim flange in the radial direction to the outer surface of the tire is defined as A, and the opening distance A with respect to the cross-sectional height SH satisfies the relationship $0.01 \leq A/SH \leq 0.16$, and the projection amount corresponding to one half of the difference between the total width TW of the tire and the rim width DW of the specified rim is defined as W, and the opening distance A with respect to the projection amount W satisfies the relationship $0.03 \leq A/W \leq 1.60$. This can effectively reduce a failure due to deflection of the tire and a failure due to rubbing between the tire and the flange and thus improve the durability of the tire.

In an embodiment of the present technology, in a state where the tire is mounted on the specified rim, inflated to the specified internal pressure, and loaded with 100% of specified load capacity, an opening distance between the tire and the rim flange on the perpendicular line drawn from the outermost point of the rim flange in the radial direction to the outer surface of the tire is defined as $A_{100}$, and the opening distance $A_{100}$ with respect to the cross-sectional height SH preferably satisfies a relationship $0.003 \leq A_{100}/SH \leq 0.100$. In particular, the opening distance $A_{100}$ with respect to the projection amount W preferably satisfies a relationship $0.010 \leq A_{100}/W \leq 1.000$. The opening distance A and the opening distance $A_{100}$ preferably satisfy a relationship $0.20 \leq A_{100}/A \leq 0.80$. This can enhance the effect of improving the durability.

The opening distance A is preferably in a range $1.5 \text{ mm} \leq A \leq 8.0 \text{ mm}$. The opening distance A with respect to a height SDH in a tire radial direction to a maximum width position of the tire preferably satisfies a relationship $0.01 \leq A/SDH \leq 0.50$. This can enhance the effect of improving the durability.

In an unloaded state where the tire is mounted on the specified rim and inflated to the specified internal pressure, an opening distance between the tire and the rim flange on a perpendicular line drawn from an intermediate point between the outermost point of the rim flange in the radial direction and an opening start point at which the rim flange separates from the tire to the outer surface of the tire is defined as A', and the opening distance A' with respect to the cross-sectional height SH preferably satisfies a relationship $0.006 \leq A'/SH \leq 0.150$. The opening distance A and the opening distance A' preferably satisfy a relationship $0.50 \leq A'/A \leq 0.96$. The opening distance A' is preferably in a range $1.0 \text{ mm} \leq A' \leq 7.5 \text{ mm}$. This can enhance the effect of improving the durability.

In an embodiment of the present technology, dimensions to be measured in an unloaded state are measured in an unloaded state where the tire is mounted on a specified rim and inflated to the specified internal pressure. On the other hand, dimensions to be measured in a loaded state is measured in a state where the tire is mounted on a specified rim, inflated to the specified internal pressure, vertically placed on a flat surface, and loaded with a load of 100% of the specified load capacity. Each of the dimensions is an average value of the measurement values measured at four locations on the tire circumference. "Specified rim" refers to a rim defined, in a standard system that includes standards on which tires are based, by the standards for each tire, and refers, for example, to a "standard rim" defined by Japan Automobile Tyre Manufacturers Association (JATMA), a "Design Rim" defined by Tire and Rim Association (TRA), or a "Measuring Rim" defined by European Tyre and Rim Technical Organization (ETRTO). "Specified internal pressure" is an air pressure corresponding to the maximum load capacity defined for each tire by each standard in a standard system including the standard on which the tire is based. "Specified load capacity" is the maximum load capacity defined for each tire by each standard in a standard system including the standard on which the tire is based.

DETAILED DESCRIPTION

Figure 1:
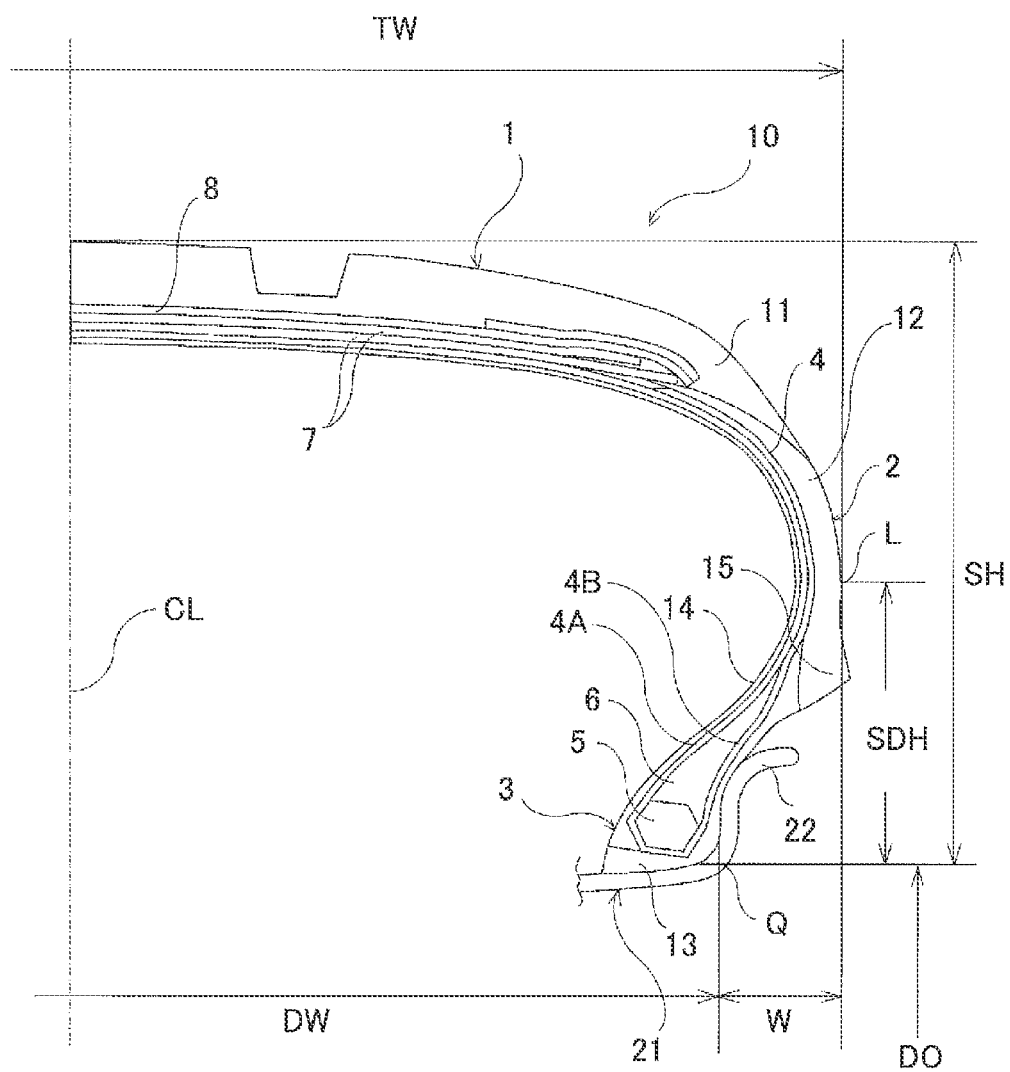
FIG. 1 is a meridian half cross-sectional view illustrating a pneumatic tire according to an embodiment of the present technology (in an unloaded state).

Configurations of embodiments of the present technology will be described in detail below with reference to the accompanying drawings. FIGS. 1 to 12 illustrate a pneumatic tire according to an embodiment of the present technology. In FIG. 1, one side of the pneumatic tire delimited by a tire equator CL is illustrated, but the pneumatic tire has a symmetrical structure or an asymmetrical structure on both sides of the tire equator CL.

As illustrated in FIG. 1, a pneumatic tire 10 of the present embodiment includes a tread portion 1 extending in a tire circumferential direction and formed in an annular shape, a pair of sidewall portions 2, 2 disposed on both sides of the tread portion 1, and a pair of bead portions 3, 3 disposed on an inner side of the sidewall portions 2 in a tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5. The carcass layer 4 includes a body portion 4A delimited by the bead core 5 and a turned-up portion 4B.

On the other hand, a plurality of belt layers 7 are embedded on the outer circumferential side of the carcass layer 4 in the tread portion 1. The belt layers 7 include a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall in a range from 10° to 40°, for example. Steel cords are preferably used as the reinforcing cords of the belt layers 7. To improve high-speed durability, at least one belt cover layer 8 formed by arranging reinforcing cords at an angle of, for example, 5° or less with respect to the tire circumferential direction is disposed on an outer circumferential side of the belt layers 7. Organic fiber cords such as nylon and aramid are preferably used as the reinforcing cords of the belt cover layer 8.

Note that the tire internal structure described above represents a typical example for the pneumatic tire 10, but the pneumatic tire is not limited thereto. In FIG. 1, a tread rubber layer 11 is disposed in the tread portion 1, a sidewall rubber layer 12 is disposed in the sidewall portion 2, and a rim cushion rubber layer 13 is disposed in the bead portion 3. An innerliner rubber layer 14 is disposed on the inner surface of the tire 10 along the carcass layer 4. Additionally, a rim protector 15 for protecting a rim flange 22 is formed on the sidewall portion 2 so as to protrude toward an outer side in a tire width direction.

Figure 2:
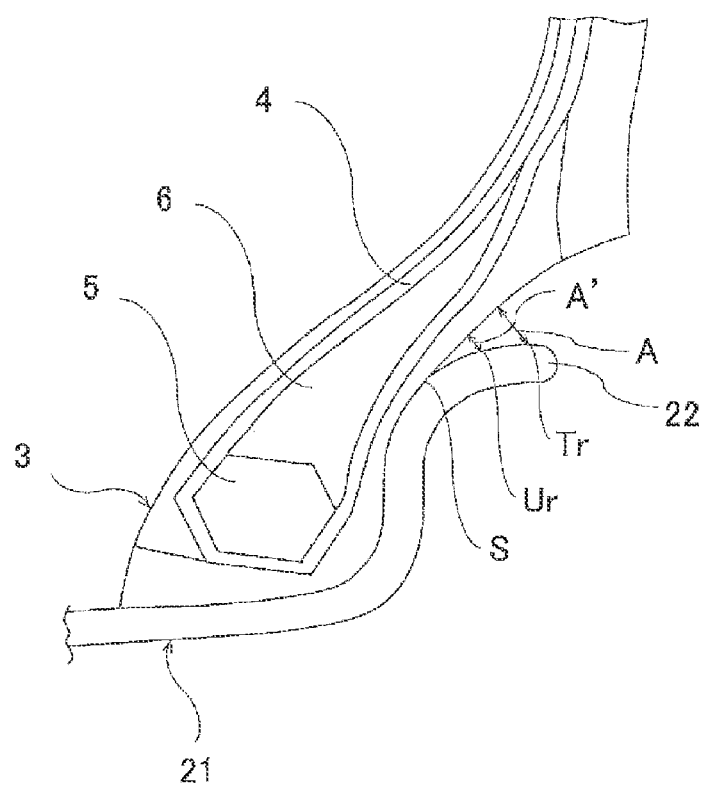
FIG. 2 is a cross-sectional view illustrating a bead portion extracted from the pneumatic tire of FIG. 1 (in an unloaded state).
Figure 3:
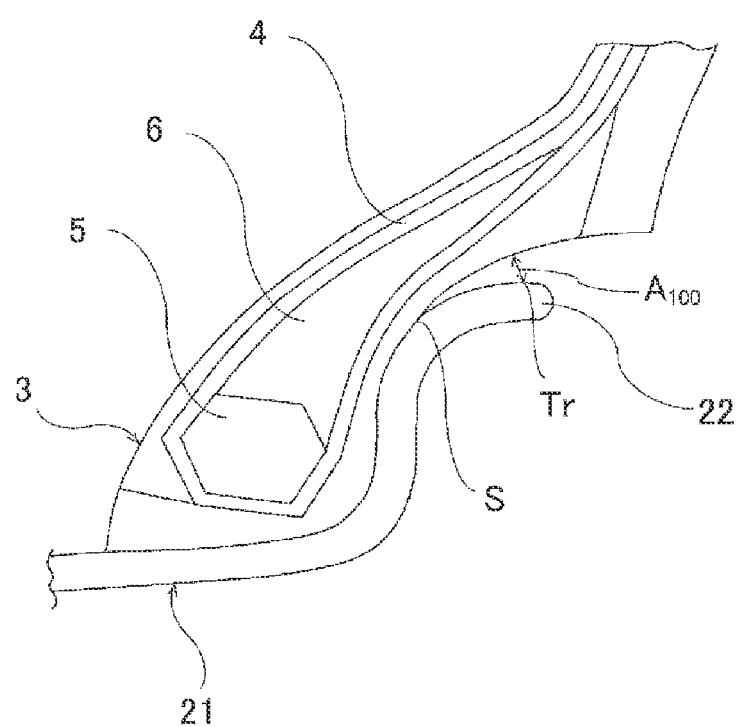
FIG. 3 is a cross-sectional view illustrating the bead portion extracted from the pneumatic tire of FIG. 1 (in a 100% loaded state).
Figure 4:
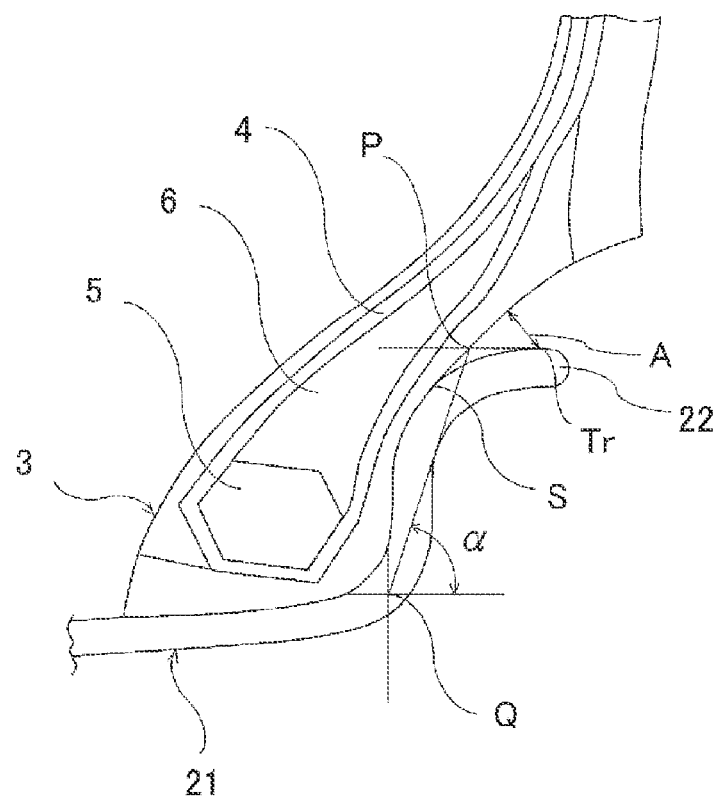
FIG. 4 is another cross-sectional view illustrating the bead portion extracted from the pneumatic tire of FIG. 1 (in an unloaded state).
Figure 5:
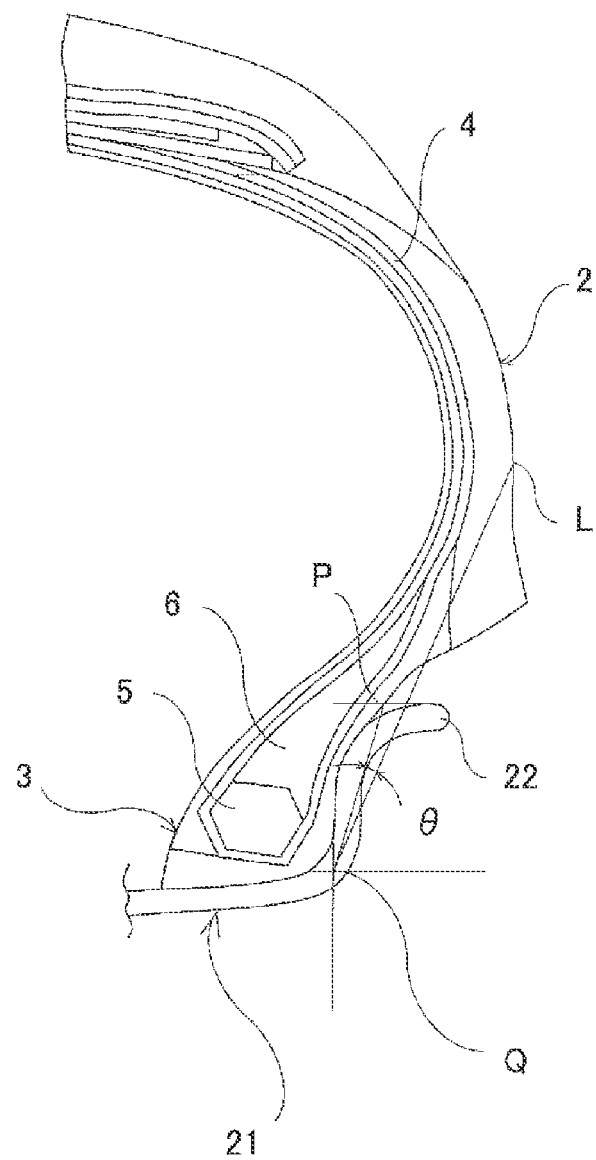
FIG. 5 is a cross-sectional view illustrating the bead portion and a sidewall portion extracted from the pneumatic tire of FIG. 1 (in an unloaded state).
Figure 6:
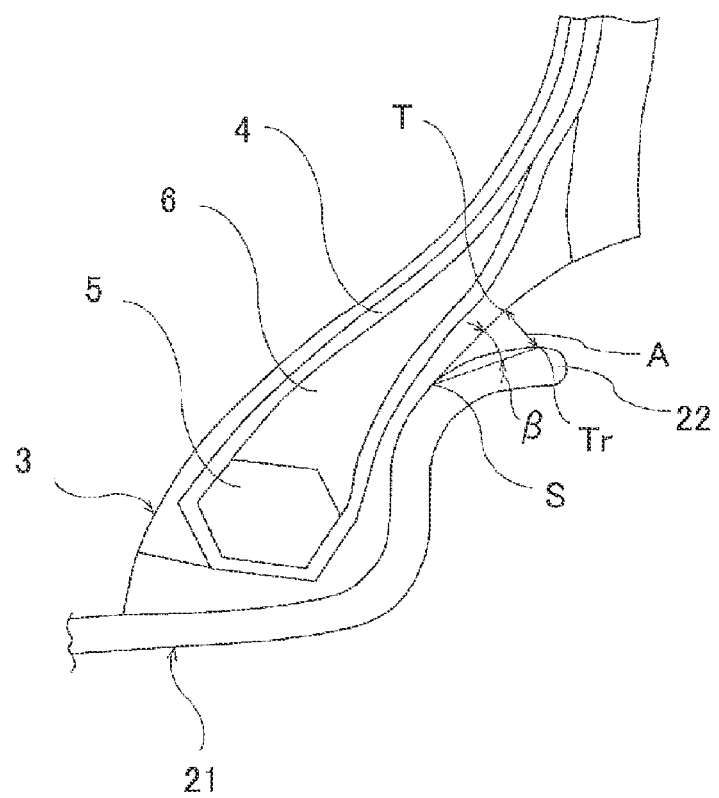
FIG. 6 is another cross-sectional view illustrating the bead portion extracted from the pneumatic tire of FIG. 1 (in an unloaded state).
Figure 7:
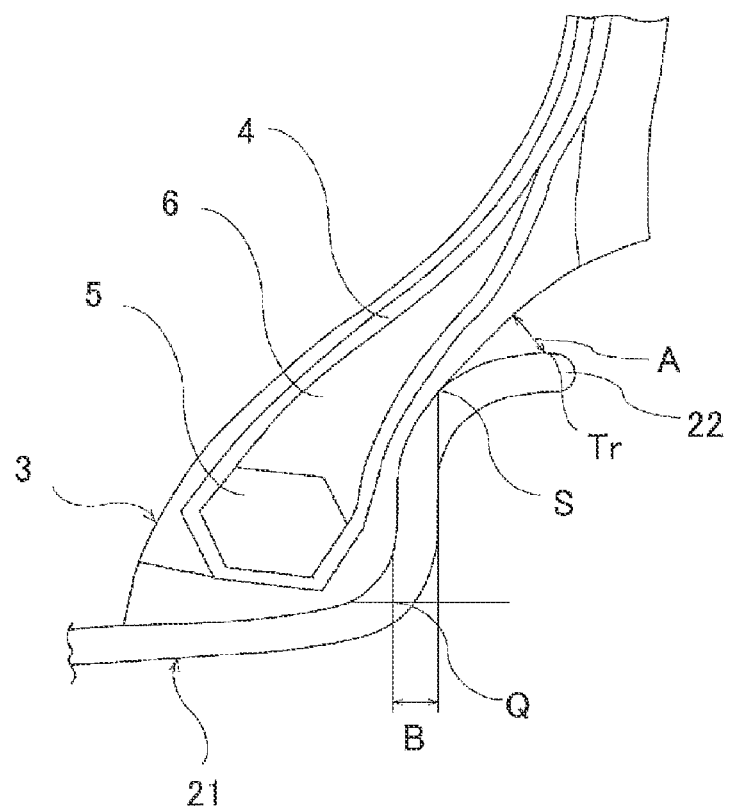
FIG. 7 is another cross-sectional view illustrating the bead portion extracted from the pneumatic tire of FIG. 1 (in an unloaded state).

The tire 10 described above has a cross-sectional height SH ranging from 50 mm to 150 mm and is mainly a tire for a passenger vehicle. The following configuration is applied to such a tire 10. In other words, as illustrated in FIGS. 1 and 2, in an unloaded state where the tire 10 is mounted on a specified rim 21 and inflated to the specified internal pressure, an opening distance between the tire 10 and the rim flange 22 on a perpendicular line drawn from an outermost point Tr of the rim flange 22 in a radial direction to the outer surface of the tire 10 is defined as A (mm), and the opening distance A with respect to the cross-sectional height SH (mm) satisfies the relationship $0.01 \leq A/SH \leq 0.16$, and a projection amount corresponding to one half of a difference between a total width TW of the tire 10 and a rim width DW of the specified rim 21 is defined as W (mm), and the opening distance A with respect to the projection amount W satisfies the relationship $0.03 \leq A/W \leq 1.60$. When the rim flange 22 has a portion extending parallel to the tire width direction at the outermost position in the radial direction, the outermost point Tr of the rim flange 22 in the radial direction is a point that is on the innermost side of the rim flange 22 in the radial direction in the outermost position of the rim flange 22 in the radial direction. The total width TW of the tire 10 is a total width of the tire 10 at a position in which the carcass layer 4 is most bulged toward an outer side in the tire width direction. In other words, the rim protector 15 for protecting the rim flange 22 is excluded from the total width TW.

In the tire 10 described above, the opening distance A between the tire 10 in the unloaded state and the rim flange 22 with respect to the cross-sectional height SH (mm) satisfies the relationship $0.01 \leq A/SH \leq 0.16$, and the opening distance A with respect to the projection amount W corresponding to one half of the difference between the total width TW of the tire 10 and the rim width D W of the specified rim 21 satisfies the relationship 0.03≤A/W≤1.60. This can properly set the opening distance A with respect to the amount of deflection and deformation of the tire 10 and effectively reduce a failure due to deflection of the tire 10 and a failure due to rubbing between the tire 10 and the flange 22. This can reduce a failure at or near the bead portion 3 and improve the durability of the tire 10. In particular, when the aspect ratio of the tire 10 is 55% or less, excellent durability is required, and in such a case, the effect of improving the durability can be enjoyed to the maximum.

Here, the ratio A/SH of less than 0.01 causes the opening distance A to be insufficient and stress at or near the rim flange 22 to increase when the tire 10 is deflected, leading to a failure. In contrast, the ratio A/SH of more than 0.16 causes the opening distance A to be too large, thus a failure due to rubbing between the tire 10 and the rim flange 22 to be likely to occur, and further pebbles or the like to be likely to enter, which may cause the durability to significantly decrease. In particular, it is preferable to satisfy the relationship 0.015≤A/SH≤0.14 and further satisfy the relationship 0.02≤A/SH≤0.12.

Similarly, the ratio A/W of less than 0.03 causes the opening distance A to be insufficient and stress at or near the rim flange 22 to increase when the tire 10 is deflected, leading to a failure. In contrast, the ratio A/W of more than 1.60 causes the opening distance A to be too large, thus a failure due to rubbing between the tire 10 and the rim flange 22 to be likely to occur, and further pebbles or the like to be likely to enter, which may cause the durability to significantly decrease. In particular, it is preferable to satisfy the relationship 0.035≤A/W≤1.5 and further satisfy the relationship 0.04≤A/W≤1.4.

In the tire 10 described above, as illustrated in FIG. 3, in a state where the tire 10 is mounted on the specified rim 21, inflated to the specified internal pressure, and loaded with 100% of specified load capacity, an opening distance between the tire 10 and the rim flange 22 on the perpendicular line drawn from the outermost point Tr of the rim flange 22 in the radial direction to the outer surface of the tire 10 is defined as $A_{100}$ (mm), and the opening distance $A_{100}$ with respect to the cross-sectional height SH (mm) preferably satisfies the relationship 0.003≤$A_{100}$/SH≤0.100. The measurement position of the opening distance $A_{100}$ is identical to the measurement position of the opening distance A. Thus optimizing the opening distance $A_{100}$ when the tire 10 is deflected allows the effect of improving the durability to be enhanced.

Here, the ratio $A_{100}$/SH of less than 0.003 causes the opening distance $A_{100}$ to be insufficient and stress at or near the rim flange 22 to increase when the tire 10 is deflected, leading to a failure. In contrast, the ratio $A_{100}$/SH of more than 0.100 causes the opening distance $A_{100}$ to be too large and thus a failure due to rubbing between the tire 10 and the rim flange 22 to be likely to occur. In either case, the effect of improving the durability decreases. In particular, it is preferable to satisfy the relationship 0.005≤$A_{100}$/SH≤0.070 and further satisfy the relationship 0.007≤$A_{100}$/SH≤0.065.

In the tire 10 described above, the opening distance $A_{100}$ (mm) with respect to the projection amount W (mm) preferably satisfies the relationship 0.010≤$A_{100}$/W≤1.000. This can enhance the effect of improving the durability.

Here, the ratio $A_{100}$/W of less than 0.010 causes the opening distance $A_{100}$ to be insufficient and stress at or near the rim flange 22 to increase when the tire 10 is deflected, leading to a failure. In contrast, the ratio $A_{100}$/W of more than 1.000 causes the opening distance $A_{100}$ to be too large and thus a failure due to rubbing between the tire 10 and the rim flange 22 to be likely to occur. In either case, the effect of improving the durability decreases. In particular, it is preferable to satisfy the relationship 0.015≤$A_{100}$/W≤0.800 and further satisfy the relationship 0.020≤$A_{100}$/W≤0.800.

In the tire 10 described above, the opening distance A (mm) and the opening distance $A_{100}$ (mm) satisfy the relationship 0.20≤$A_{100}$/A≤0.80. This can reduce stress due to repeated deformation and enhance the effect of improving the durability.

Here, the ratio $A_{100}$/A of less than 0.20 causes deformation at or near the rim flange 22 to significantly increase when the tire 10 is deflected, and thus the effect of improving the durability may decrease. In contrast, the ratio $A_{100}$/A of more than 0.80 causes deformation at a position away from the rim flange 22 to significantly increase when the tire 10 is deflected, and thus the effect of improving the durability may decrease. In particular, it is preferable to satisfy the relationship 0.23≤$A_{100}$/A≤0.75 and further satisfy the relationship 0.25≤$A_{100}$/A≤0.70.

In the tire 10 described above, the opening distance A is preferably in the range 1.5 mm≤A≤8.0 mm. This can reduce stress due to repeated deformation and enhance the effect of improving the durability.

Here, the opening distance A of less than 1.5 mm causes the opening distance A to be insufficient and stress at or near the rim flange 22 to increase when the tire 10 is deflected, leading to a failure. In contrast, the opening distance A of more than 8.0 mm causes the opening distance A to be too large and thus a failure due to rubbing between the tire 10 and the rim flange 22 to be likely to occur. In either case, the effect of improving the durability decreases. In particular, the opening distance A is preferably in the range of 1.8 mm≤A≤7.5 mm, and it is further preferably in the range 2.0 mm A S 7.0 mm.

In the tire 10 described above, the opening distance A (mm) with respect to a height SDH (mm) in the tire radial direction to the maximum width position (measurement position of the total width TW) of the tire 10 preferably satisfies the relationship 0.01≤A/SDH≤0.50. Specifying the opening distance A with respect to the height SDH having a significant influence on the deformation of the bead portion 3 allows stress due to repeated deformation to be reduced and the effect of improving the durability to be enhanced.

Here, the ratio A/SDH of less than 0.01 causes the opening distance A to be insufficient and stress at or near the rim flange 22 to increase when the tire 10 is deflected, leading to a failure. In contrast, the ratio A/SDH of more than 0.50 causes the opening distance A to be too large and thus a failure due to rubbing between the tire 10 and the rim flange 22 to be likely to occur. In either case, the effect of improving the durability decreases. In particular, it is preferable to satisfy the relationship 0.02≤A/SDH≤0.45 and further satisfy the relationship 0.03≤A/SDH≤0.40.

In the tire 10 described above, as illustrated in FIG. 2, in an unloaded state where the tire 10 is mounted on the specified rim 21 and inflated to the specified internal pressure, an opening distance between the tire 10 and the rim flange 22 on a perpendicular line drawn from an intermediate point Ur between the outermost point Tr of the rim flange 22 in the radial direction and an opening start point S at which the rim flange 22 separates from the tire 10 to the outer surface of the tire 10 is defined as A' (mm), and the opening distance A' with respect to the cross-sectional height SH (mm) preferably satisfies the relationship 0.006≤A'/SH≤0.150. This can reduce stress due to repeated deformation and enhance the effect of improving the durability.

Here, the ratio A'/SH of less than 0.006 causes the opening distance A' to be insufficient and stress at or near the rim flange 22 to increase when the tire 10 is deflected, leading to a failure. In contrast, the ratio A'/SH of more than 0.150 causes the opening distance A' to be too large and thus a failure due to rubbing between the tire 10 and the rim flange 22 to be likely to occur. In either case, the effect of improving the durability decreases. In particular, it is preferable to satisfy the relationship 0.010≤A'/SH≤0.130 and further satisfy the relationship 0.014≤A'/SH≤0.110.

In the tire 10 described above, the opening distance A (mm) and the opening distance A' (mm) preferably satisfy the relationship 0.50≤A'/A≤0.%.

This can reduce stress due to repeated deformation and enhance the effect of improving the durability.

Here, the ratio A'/A of less than 0.50 causes the opening distance A' to be insufficient and stress at or near the rim flange 22 to increase when the tire 10 is deflected, leading to a failure. In contrast, the ratio A'/A of more than 0.96 causes the opening distance A' to be too large and thus a failure due to rubbing between the tire 10 and the rim flange 22 to be likely to occur. In either case, the effect of improving the durability decreases. In particular, it is preferable to satisfy the relationship 0.53≤A'/A≤0.94 and further satisfy the relationship 0.56≤A'/A≤0.92.

In the tire 10 described above, the opening distance A' is preferably in the range 1.0 mm≤A'≤7.5 mm. This can reduce stress due to repeated deformation and enhance the effect of improving the durability.

Here, the opening distance A' of less than 1.0 mm causes the opening distance A' to be insufficient and stress at or near the rim flange 22 to increase when the tire 10 is deflected, leading to a failure. In contrast, the opening distance A' of more than 7.5 mm causes the opening distance A' to be too large and thus a failure due to rubbing between the tire 10 and the rim flange 22 to be likely to occur. In either case, the effect of improving the durability decreases. In particular, the opening distance A' is preferably in the range 1.2 mm≤A'≤7.0 mm and is further preferably in the range 1.4 mm≤A'≤6.5 mm.

In the tire 10 described above, as illustrated in FIG. 4, in an unloaded state where the tire 10 is mounted on the specified rim 21 and inflated to the specified internal pressure, a point at which a horizontal line in the tire width direction passing through the outermost point Tr of the rim flange 22 in the radial direction intersects with the outer surface of the tire 10 is defined as P, a point specifying the rim width DW and a rim diameter DO of the specified rim 21 is defined as Q, and an angle α formed by a straight line connecting the points P and Q and a horizontal line in the tire width direction is preferably in the range 50°≤α≤80°.

The angle α corresponding to the inclination angle of the bead portion 3 is in the range 50°≤α≤80° in this manner. This can properly set the opening distance A with respect to the amount of deflection and deformation of the tire 10 and effectively reduce a failure due to deflection of the tire 10 and a failure due to rubbing between the tire 10 and the flange 22. This can reduce a failure at or near the bead portion 3 and further enhance the effect of improving the durability of the tire 10.

Here, the angle α of less than 50° causes the opening distance A to be insufficient and stress at or near the rim flange 22 to increase when the tire 10 is deflected, leading to a failure. In contrast, the angle α of more than 80° causes the opening distance A to be too large, thus a failure due to rubbing between the tire 10 and the rim flange 22 to be likely to occur, and further pebbles or the like to be likely to enter, which may cause the durability to significantly decrease. In particular, it is preferable to satisfy the range 55°≤α≤750 and further satisfy the range 600≤α≤70°.

In the tire 10 as described above, as illustrated in FIGS. 1 and 5, in an unloaded state where the tire 10 is mounted on the specified rim 21 and inflated to the specified internal pressure, a point specifying the total width TW of the tire 10 is defined as L. and an angle θ formed by the straight line connecting the points P and Q and a straight line connecting the points L and Q is preferably in the range 2°≤θ≤30°. This can properly set the opening distance A with respect to the amount of deflection and deformation and enhance the effect of improving the durability.

Here, the angle θ of less than 2° causes the opening distance A to be insufficient and stress at or near the rim flange to increase when the tire 10 is deflected, leading to a failure. In contrast, the angle θ of more than 30° causes the opening distance A to be too large and thus a failure due to rubbing between the tire 10 and the rim flange 22 to be likely to occur. In either case, the effect of improving the durability decreases. In particular, it is preferable to satisfy the range 4°≤θ≤250 and further satisfy 6°≤θ≤20°.

In the tire 10 described above, as illustrated in FIG. 6, in an unloaded state where the tire 10 is mounted on the specified rim 21 and inflated to the specified internal pressure, the opening start point at which the rim flange 22 separates from the tire 10 is defined as S, the outermost point of the rim flange 22 in the radial direction is defined as Tr, a point at which the perpendicular line drawn from the point Tr to the outer surface of the tire 10 intersects with the outer surface of the tire 10 is defined as T. and an angle θ formed by a straight line connecting the points S and T and a straight line connecting the points S and Tr is preferably in the range 15°≤β≤65°. This can enhance the effect of improving the durability.

Here, the angle β of less than 15° causes stress at or near the rim flange 22 to increase when the tire 10 is deflected, leading to a failure. In contrast, the angle β of more than 65° causes a failure due to rubbing between the tire 10 and the rim flange 22 to be likely to occur. In particular, it is preferable to satisfy the range 20°≤β≤60° and further satisfy the range 25°≤β≤55°.

In the tire 10 described above, as illustrated in FIG. 7, a horizontal distance B (mm) in the tire width direction between the points Q and S with respect to the cross-sectional height SH (mm) preferably satisfies the relationship 0.02≤B/SH≤0.18. This allows stress due to repeated deformation to fall within an appropriate range and the effect of improving the durability to be enhanced.

Here, the ratio B/SH of less than 0.02 causes a failure due to rubbing between the tire 10 and the rim flange 22 to be likely to occur. In contrast, the ratio B/SH of more than 0.18 causes stress at or near the rim flange 22 to increase when the tire 10 is deflected, leading to a failure. In either case, the effect of improving the durability decreases. In particular, it is preferable to satisfy the relationship 0.03≤B/SH≤0.15 and further satisfy the relationship 0.04≤B/SH≤0.13.

In the tire 10 described above, the horizontal distance B is preferably in the range 3.0 mm≤B≤9.0 mm. This allows stress due to repeated deformation to fall within an appropriate range and the effect of improving the durability to be enhanced.

Here, the horizontal distance B of less than 3.0 mm causes a failure due to rubbing between the tire 10 and the rim flange 22 to be likely to occur. In contrast, the horizontal distance B of more than 9.0 mm causes stress at or near the rim flange 12 to increase when the tire 10 is deflected, leading to a failure. In either case, the effect of improving the durability decreases. In particular, the horizontal distance B is preferably in the range 3.2 mm≤B≤8.5 mm and is further preferably in the range 3.4 mm≤B≤8.0 mm.

In the tire 10 described above, as illustrated in FIG. 8, a point at which the perpendicular line drawn from the outermost point Tr of the rim flange 22 in the radial direction to the outer surface of the tire 10 intersects with the outer surface of the tire 10 is defined as T. and the arc (radius of curvature Rb) of the tire 10 passing through the points S. P, and T preferably has a center on an outer side in the tire width direction. This makes it difficult for compressive stress to be applied to a portion that comes into contact with the rim flange 22 of the tire 10 and thus can enhance the effect of improving the durability.

Figure 8:
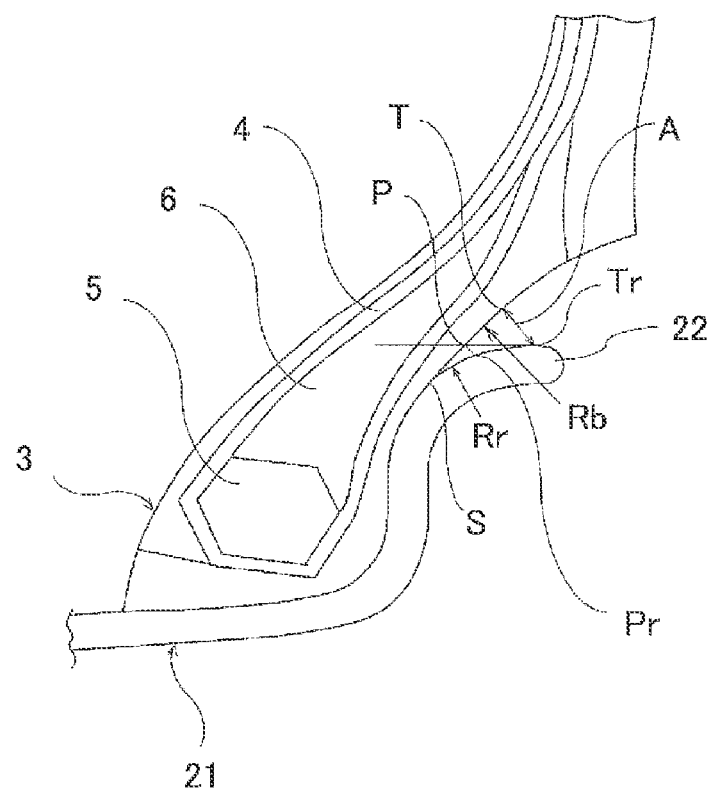
FIG. 8 is another cross-sectional view illustrating the bead portion extracted from the pneumatic tire of FIG. 1 (in an unloaded state).
Figure 9:
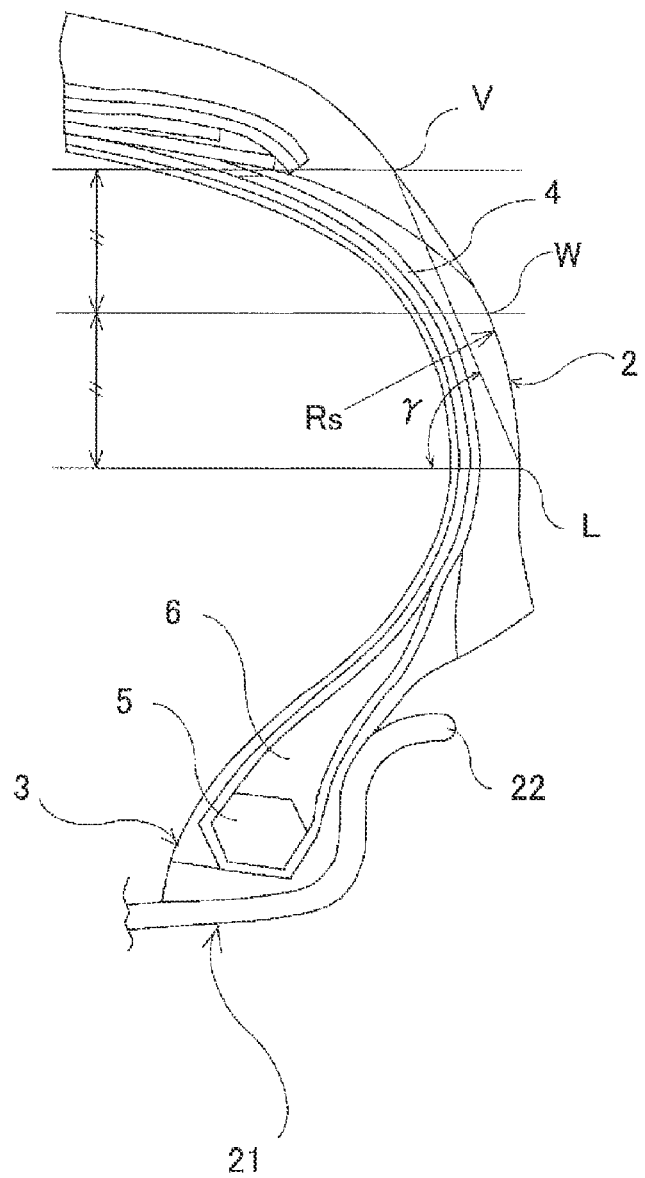
FIG. 9 is another cross-sectional view illustrating the bead portion and the sidewall portion extracted from the pneumatic tire of FIG. 1 (in an unloaded state).
Figure 10:
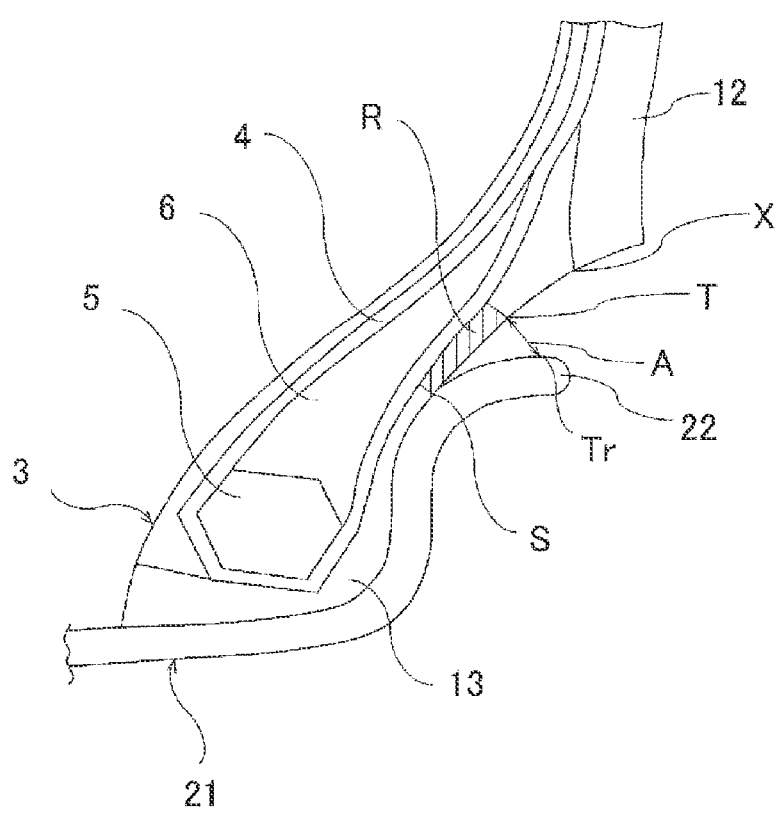
FIG. 10 is another cross-sectional view illustrating the bead portion extracted from the pneumatic tire of FIG. 1 (in an unloaded state).

In particular, as illustrated in FIG. 8, the point at which a perpendicular line drawn from the point P to the outer surface of the tire 10 intersects with the outer surface of the rim flange 22 is defined as Pr, and the radius of curvature Rb (mm) of the arc of the tire 10 passing through the points S, P, and T with respect to a radius of curvature Rr (mm) of the arc of the rim flange 22 passing through the points S, Pr, and Tr preferably satisfies the relationship 1.2≤Rb/Rr≤14.5. This makes it difficult for compressive stress to be applied to a portion that comes into contact with the rim flange 22 of the tire 10 and thus can enhance the effect of improving the durability.

Here, when the ratio Rb/Rr is out of the range described above, compressive stress is likely to be applied to a portion of the tire 10 that comes into contact with the rim flange 22, and thus the effect of improving the durability decreases. In particular, it is preferable to satisfy the relationship 1.5≤Rb/Rr≤12.2 and further satisfy the relationship 2.0≤Rb/Rr≤10.0.

In the tire 10 described above, as illustrated in FIG. 9, in an unloaded state where the tire 10 is mounted on the specified rim 21 and inflated to the specified internal pressure, a point at which a horizontal line in the tire width direction passing through an edge portion of the belt layer 7 on the innermost side in the tire radial direction of the plurality of belt layers 7 intersects with the outer surface of the tire 10 is defined as V, the point specifying the total width TW of the tire 10 is defined as L, and an angle γ formed by a straight line connecting the points L and V and a horizontal line in the tire width direction is preferably in the range 45°≤γ≤80°. This allows stress due to repeated deformation to fall within an appropriate range and the effect of improving the durability to be enhanced.

Here, when the angle γ is out of the range described above, stress due to repeated deformation is out of an appropriate range, and thus the effect of improving the durability decreases. In particular, it is preferable to satisfy the range 50°≤γ≤75° and further satisfy the range 55°≤γ≤70°.

In the tire 10 described above, as illustrated in FIG. 9, a point located at the center between the points L and V in the tire radial direction on the outer surface of the tire 10 is defined as W, and a radius of curvature Rs of the arc of the tire 10 passing through the points V, W. and L with respect to the cross-sectional height SH preferably satisfies the relationship 0.3≤Rs/SH≤2.5. This allows stress due to repeated deformation to fall within an appropriate range and the effect of improving the durability to be enhanced.

Here, when the ratio Rs/SH is out of the range described above, stress due to repeated deformation is out of an appropriate range, and thus the effect of improving the durability decreases. In particular, it is preferable to satisfy the relationship 0.4≤Rs/SH≤2.3 and further satisfy the relationship 0.5≤Rs/SH≤2.0.

In the tire 10 described above, as illustrated in FIG. 10, in an unloaded state where the tire 10 is mounted on the specified rim 21 and inflated to the specified internal pressure, the opening start point at which the rim flange 22 separates from the tire 10 is defined as S, the point at which the perpendicular line drawn from the outermost point Tr of the rim flange 22 in the radial direction to the outer surface of the tire 10 intersects with the outer surface of the tire 10 is defined as T, two perpendicular lines are drawn from the points S and T to the turned-up portion 4B of the carcass layer 4, and a cross-sectional area Sr of a rubber portion R (hatched portion) included in a region surrounded by these two perpendicular lines and the turned-up portion 4B of the carcass layer 4 is preferably in the range 12 mm²≤Sr≤101 mm². The cross-sectional area Sr of the rubber portion R is the cross-sectional area of a portion located further on an outer side than carcass cords constituting the carcass layer 4.

As described above, the cross-sectional area Sr of the rubber portion R bearing the buffering function with respect to the rim flange 22 is in the range 12 mm²≤Sr≤101 mm². This can properly set the opening distance A with respect to the amount of deflection and deformation of the tire 10 and effectively reduce a failure due to deflection of the tire 10 and a failure due to rubbing between the tire 10 and the flange 22. This can reduce a failure at or near the bead portion 3 and further enhance the effect of improving the durability of the tire 10.

Here, the cross-sectional area Sr of the rubber portion R of smaller than 12 mm² causes compressive stress to be likely to be applied to the carcass layer 4 at or near the rim flange 22 when the tire 10 is deflected, leading to a failure. In contrast, the cross-sectional area Sr of larger than 101 mm² makes it difficult to sufficiently have the opening distance A and causes stress at or near the rim flange 22 to increase when the tire 10 is deflected, leading to a failure. In particular, it is preferable to satisfy the range 14 mm²≤Sr≤98 mm² and further satisfy the range 16 mm²≤Sr≤93 mm².

In the tire 10 described above, as illustrated in FIG. 11, the thickness of the rubber portion R on the perpendicular line drawn from the point S to the turned-up portion 4B of the carcass layer 4 is defined as Gl (mm), the thickness of the rubber portion R on the perpendicular line drawn from the point T to the turned-up portion 4B of the carcass layer 4 is defined as Gu (mm), and the thicknesses Gl and Gu preferably satisfy the relationship 0.40≤Gl/Gu≤0.90. This allows a good buffering function to be ensured and the effect of improving the durability to be enhanced.

Here, when the ratio Gl/Gu is out of the range described above, the buffering function decreases, and the effect of improving the durability decreases. In particular, it is preferable to satisfy the relationship 0.45≤Gl/Gu≤0.85 and further satisfy the relationship 0.50≤Gl/Gu≤0.80. Preferably, the thickness Gl of the rubber portion R satisfies the range 0.5 mm≤Gl≤4.0 mm and further satisfies the range 1.5 mm≤Gl≤3.0 mm. The thicknesses Gl and Gu of the rubber portion R can also be measured in a cut sample of the tire 10.

In the tire 10 described above, as illustrated in FIG. 11, in an unloaded state where the tire 10 is mounted on the specified rim 21 and inflated to the specified internal pressure, a point at which the perpendicular line drawn from the point S to the turned-up portion 4B of the carcass layer 4 intersects with the turned-up portion 4B of the carcass layer 4 is defined as Sc, a point at which a perpendicular line drawn from the point T to the turned-up portion 4B of the carcass layer 4 intersects with the turned-up portion 4B of the carcass layer 4 is defined as Tc, an intermediate point between the points Sc and Tc is defined as Uc, and the arc (radius of curvature RC) of the carcass layer 4 passing through points Sc. Tc, and Uc preferably has a center on an outer side in the tire width direction. This makes it difficult for compressive stress to be applied to the carcass layer 4 when the tire is deformed and thus can enhance the effect of improving the durability. The arc of the carcass layer 4 passing through the points Sc, Tc, and Uc preferably has a center on an outer side in the tire width direction even in a state where the tire 10 is a single body while not being mounted on a rim or in a state where a 100% load is applied to the tire.

Figure 11:
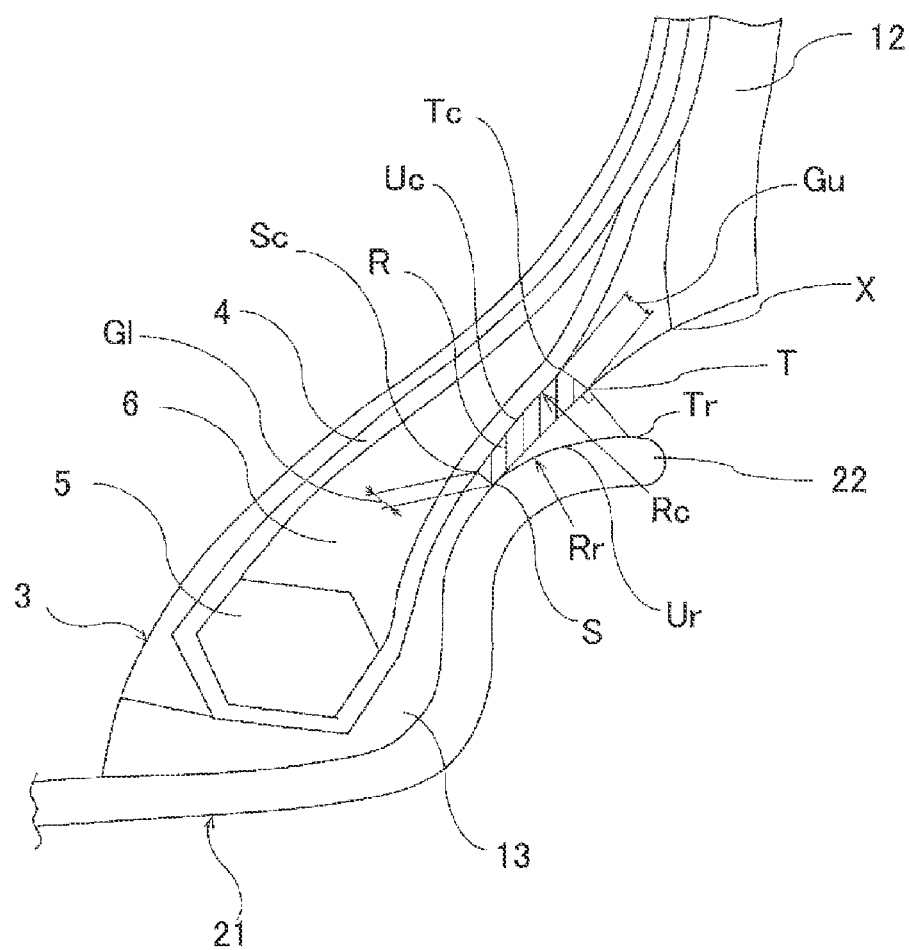
FIG. 11 is another cross-sectional view illustrating the bead portion extracted from the pneumatic tire of FIG. 1 (in an unloaded state).

In particular, as illustrated in FIG. 11, the intermediate point between the points S and Tr is defined as Ur, and the radius of curvature Rc (mm) of the arc of the carcass layer 4 passing through the points Sc, Tc, and Uc with respect to the radius of curvature Rr (mm) of the arc of the rim flange 22 passing through the points S. Tr, and Ur preferably satisfies the relationship $1 \leq Rc/Rr \leq 55$. This makes it difficult for compressive stress to be applied to the carcass layer 4 when the tire is deformed and thus can enhance the effect of improving the durability.

Here, when the ratio Rc/Rr is out of the range described above, compressive stress is likely to be applied to the carcass layer 4 when the tire is deformed, and thus the effect of improving the durability decreases. In particular, it is preferable to satisfy the relationship $2 \leq Rc/Rr \leq 50$ and further satisfy the relationship $3 \leq Rc/Rr \leq 45$.

Figure 12:
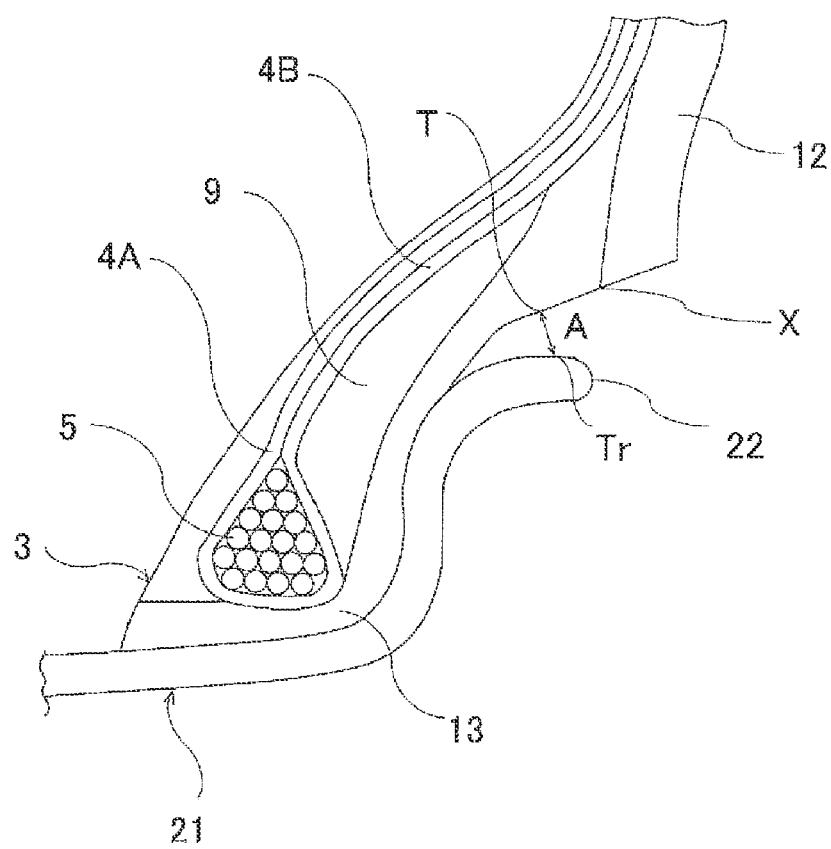
FIG. 12 is a cross-sectional view illustrating a modified example of the bead portion (in an unloaded state).

FIG. 12 illustrates a modified example of the bead portion. In FIG. 12, the body portion 4A and the turned-up portion 4B of the carcass layer 4 are in contact with each other without a bead filler interposed therebetween and thus form a closed region including the bead core 5. In other words, the carcass layer 4 is wound up around the bead core 5 from the inner side to the outer side of the tire such that the body portion 4A and the turned-up portion 4B are disposed in close contact with each other at the upper end position of the bead core 5. Adopting such a turned-up structure of the carcass layer 4 allows the carcass layer 4 to be kept away from the rim flange 22 at a contact portion with the rim flange 22, allowing compressive stress applied to the carcass layer 4 to be significantly reduced and the effect of improving the durability to be enhanced. The rubber distribution in the closed region formed by the carcass layer 4 is preferably 15% or less, more preferably 10% or less, and further more preferably 5% or less. The rubber distribution mentioned here is a percentage of a rubber portion (for example, an insulation rubber of a bead wire or a small bead filler) in the closed region formed by the carcass layer 4 in a tire meridian cross-section.

Additionally, in the structure of FIG. 12, the durability can be improved by disposing the secondary bead filler 9 on an outer side of the turned-up portion 4B of the carcass layer 4 in the tire width direction or by increasing the thickness of the rim cushion rubber layer 13. In this case, the cross-sectional area Sr of the rubber portion R can be set in the range $36 \text{ mm}^2 \leq Sr \leq 101 \text{ mm}^2$. In particular, it is preferable to satisfy the range $42 \text{ mm}^2 \leq Sr \leq 98 \text{ mm}^2$ and further satisfy the range $48 \text{ mm}^2 \leq Sr \leq 93 \text{ mm}^2$.

In the tire 10 described above, as illustrated in FIG. 10, when the tire 10 includes the rim cushion rubber layer 13 disposed in the region in contact with the rim flange 22 and the sidewall rubber layer 12 disposed on an outer side of the rim cushion rubber layer 13 in the tire radial direction, a boundary point X between the rim cushion rubber layer 13 and the sidewall rubber layer 12 on the outer surface of the tire 10 is preferably located further on an outer side in the tire radial direction than the point T in an unloaded state in which the tire 10 is mounted on a specified rim and inflated to the specified internal pressure. In other words, the rim cushion rubber layer 13 preferably extends from the lower side of the bead core 5 toward the outer side in the tire radial direction at least to the position of the point T. This makes it difficult for compressive stress to be applied to the carcass layer 4 when the tire is deformed and thus can enhance the effect of improving the durability.

The hardness of the rim cushion rubber layer 13 at 20° C. is preferably 55 or more and 80 or less. This can improve the durability of the rim cushion rubber layer 13. Here, when the hardness of the rim cushion rubber layer 13 is out of the range described above, the effect of improving the durability decreases. The hardness is the durometer hardness measured in accordance with JIS (Japanese Industrial Standard)-K6253 with the use of a type A durometer and under a temperature of 20° C.

The 100% modulus of the rim cushion rubber layer 13 at 20° C. is preferably 2.0 MPa or more and 9.5 MPa or less. This can improve the durability of the rim cushion rubber layer 13. Here, when the 100% modulus of the rim cushion rubber layer 13 is out of the range described above, the effect of improving the durability decreases. The 100% modulus is a predetermined tensile stress measured at a temperature of 20° C. in accordance with JIS-K6251.

The loss tangent (tan δ) at 20° C. of the rim cushion rubber layer 13 is preferably 0.05 or more and 0.35 or less. This can suppress an increase in rolling resistance while having the thickness (durability) of the rim cushion rubber layer 13. Here, the loss tangent of the rim cushion rubber layer 13 of more than 0.35 will cause the rolling resistance to increase. Loss tangent (tan δ) is measured according to JIS-K6394 using a viscoelastic spectrometer (available from Toyo Seiki Seisaku-sho, Ltd.) at a frequency of 20 Hz, an initial strain of 10%, a dynamic strain of 2%, and a temperature of 60° C.

The intermediate elongation of the carcass cords constituting the carcass layer 4 under a load of 1.5 cN/dtex is preferably 3.3% or more and 6.2% or less. This can enhance the effect of improving the durability. Here, when the intermediate elongation under a load of 1.5 cN/dtex of the carcass cords constituting the carcass layer 4 is out of the range described above, the effect of improving the durability decreases. In particular, the intermediate elongation of the carcass cords under a load of 1.5 cN/dtex is preferably 3.8% or more and 5.9% or less. The intermediate elongation is measured by performing a tensile test, on the carcass cords removed from the sidewall portion of the tire 10, in accordance with JIS-L1017 at a length between grips of 250 mm and a tensile speed of 300±20 mm/minute.

The carcass cords constituting the carcass layer 4 are organic fiber cords. When, for example, high-modulus rayon cords are used as the carcass cords, the durability is improved. The total thickness of the carcass layer 4 is preferably 0.8 mm or more and 1.5 mm or less. In the case of the rayon cords, the cord diameter is preferably 0.6 mm or more and 1.1 mm or less, and the cord density is preferably 43 cords or more/50 mm and 59 cords or less/50 mm. Polyester cords having excellent fatigue resistance are also preferable as carcass cords. In the case of the polyester cords, the cord diameter is preferably 0.7 mm or more and 1.2 mm or less, and the cord density is preferably 44 cords or more/50 mm and 60 cords or less/50 mm.

Further, the angle of the carcass cords constituting the carcass layer 4 with respect to the tire circumferential direction can be set in the range of 75° or more and 90° or less. In particular, when the angle of the carcass cords is set to be less than 88°, the tire rigidity is increased and thus the durability is improved. Furthermore, the turned-up portion 4B of the carcass layer 4 preferably extends beyond the tire maximum width position to a position overlapped with the edge portion of the belt layer 7. Adopting such a turned-up portion structure increases the tire rigidity, thus improving the durability.

EXAMPLES

Pneumatic tires of Comparative Examples 1 to 4 and Examples 1 to 8 were manufactured, and each of the tires having a tire size of 285/35R20 (SH=95 mm) has the height SDH, the total width TW, the rim width DW of the specified rim, the projection amount W, the ratio A/SH, the ratio A/W, the ratio $A_{100}$/SH, the ratio $A_{100}$/W, the ratio $A_{100}$/A, the opening distance A, the opening distance $A_{100}$, the ratio A/SDH, the ratio A'/SH, the ratio A'/A. and the opening distance A' were set as shown in Table 1.

For the test tires, strain resistance performance and rubbing resistance performance were evaluated by the following test methods, and the results are shown in Table 1.

Strain Resistance Performance

Each test tire was assembled on a wheel having a rim size of 20×1 OJ and mounted on a tester having a drum diameter of 1707 mm, and at an air pressure set to 290 kPa, a speed set to 81 km/h, and an initial load set to 88% of the maximum load capacity, the load was increased by 13% every 2 hours, and the travel distance until failure occurred in the tire was measured. Evaluation results are expressed as index values with Comparative Example 2 being assigned an index value of 100. Larger index values indicate excellent stain resistance performance.

Rubbing Resistance Performance

Each test tire was assembled on a wheel having a rim size of 20×10J and mounted on a tester having a drum diameter of 1707 mm, and at an air pressure set to 290 kPa, a speed set to 81 km/h, and an initial load set to 88% of the maximum load capacity, the load was increased by 13% every 2 hours, and a 2500 km running test was performed. The rubber thickness from the tire outer surface to the carcass layer at a position corresponding to the outermost point of the rim flange in the radial direction was measured before and after the test, and the amount of change of the rubber thickness was determined. The evaluation results are expressed as index values using the reciprocal of the amount of change of the rubber thickness, with Comparative Example 1 being assigned the value of 100. Larger index values indicate excellent rubbing resistance performance.

TABLE 1

|  | Comparative Example 1 | Comparative Example 2 | Comparative Example 3 | Comparative Example 4 |
|---|---|---|---|---|
| SH (mm) | 95 | 95 | 95 | 95 |
| SDH (mm) | 54 | 54 | 54 | 54 |
| TW (mm) | 306 | 306 | 306 | 306 |
| DW (mm) | 280 | 280 | 280 | 280 |
| W (mm) | 13 | 13 | 38.0 | 9.2 |
| A/SH | 0.005 | 0.221 | 0.01 | 0.16 |
| A/W | 0.038 | 1.585 | 0.025 | 1.650 |
| $A_{100}$/SH | 0.000 | 0.168 | 0.002 | 0.116 |
| $A_{100}$/W | 0.000 | 1.208 | 0.005 | 1.194 |

TABLE 1-continued

| $A_{100}$/A | 0.00 | 0.76 | 4.750 | 1.382 |
|---|---|---|---|---|
| A (mm) | 0.5 | 21.0 | 1.0 | 15.2 |
| $A_{100}$ (mm) | 0.0 | 16.0 | 0.2 | 11 |
| A/SDH | 0.01 | 0.389 | 0.02 | 0.28 |
| A'/SH | 0.003 | 0.003 | 0.003 | 0.003 |
| A'/A | 0.60 | 0.01 | 0.32 | 0.02 |
| A' (mm) | 0.3 | 0.3 | 0.3 | 0.3 |
| Strain resistance performance (index value) | 95 | 100 | 97 | 100 |
| Rubbing resistance performance (index value) | 100 | 95 | 100 | 96 |

|  | Example 1 | Example 2 | Example 3 | Example 4 |
|---|---|---|---|---|
| SH (mm) | 95 | 95 | 95 | 95 |
| SDH (mm) | 45 | 45 | 45 | 45 |
| TW (mm) | 306 | 306 | 306 | 306 |
| DW (mm) | 280 | 280 | 280 | 280 |
| W (mm) | 13 | 13 | 43 | 13 |
| A/SH | 0.016 | 0.016 | 0.032 | 0.021 |
| A/W | 0.113 | 0.113 | 0.070 | 0.151 |
| $A_{100}$/SH | 0.001 | 0.017 | 0.004 | 0.009 |
| $A_{100}$/W | 0.008 | 0.121 | 0.009 | 0.068 |
| $A_{100}$/A | 0.07 | 1.07 | 0.13 | 0.45 |
| A (mm) | 1.5 | 1.5 | 3.0 | 2.0 |
| $A_{100}$ (mm) | 0.1 | 1.6 | 0.4 | 0.9 |
| A/SDH | 0.03 | 0.03 | 0.07 | 0.04 |
| A'/SH | 0.005 | 0.005 | 0.005 | 0.005 |
| A'/A | 0.33 | 0.33 | 0.17 | 0.25 |
| A' (mm) | 0.5 | 0.5 | 0.5 | 0.5 |
| Strain resistance performance (index value) | 103 | 106 | 103 | 108 |
| Rubbing resistance performance (index value) | 103 | 106 | 105 | 108 |

|  | Example 5 | Example 6 | Example 7 | Example 8 |
|---|---|---|---|---|
| SH (mm) | 95 | 95 | 95 | 95 |
| SDH (mm) | 45 | 68 | 45 | 68 |
| TW (mm) | 306 | 306 | 306 | 306 |
| DW (mm) | 280 | 280 | 280 | 280 |
| W (mm) | 13 | 13 | 13 | 13 |
| A/SH | 0.045 | 0.005 | 0.045 | 0.045 |
| A/W | 0.325 | 0.038 | 0.325 | 0.325 |
| $A_{100}$/SH | 0.017 | 0.017 | 0.017 | 0.017 |
| $A_{100}$/W | 0.121 | 0.121 | 0.121 | 0.121 |
| $A_{100}$/A | 0.37 | 3.20 | 0.37 | 0.37 |
| A (mm) | 4.3 | 0.5 | 4.3 | 4.3 |
| $A_{100}$ (mm) | 1.6 | 1.6 | 1.6 | 1.6 |
| A/SDH | 0.10 | 0.007 | 0.10 | 0.063 |
| A'/SH | 0.005 | 0.001 | 0.008 | 0.026 |
| A'/A | 0.12 | 0.20 | 0.19 | 0.58 |
| A' (mm) | 0.5 | 0.1 | 0.8 | 2.5 |
| Strain resistance performance (index value) | 110 | 108 | 112 | 115 |
| Rubbing resistance performance (index value) | 110 | 110 | 112 | 113 |

As can be seen from Table 1, the tires of Examples 1 to 8 were improved in both the strain resistance performance and the rubbing resistance performance and had excellent durability in comparison with Comparative Examples 1 to 4.

Thhe invention claimed is:

1. A tire having a cross-sectional height SH ranging from 50 mm to 150 mm, in an unloaded state where the tire is mounted on a specified rim and inflated to a specified internal pressure, an opening distance between the tire and a rim flange on a perpendicular line drawn from an outermost point of the rim flange in a radial direction to an outer surface of the tire being defined as A, and the opening distance A with respect to the cross-sectional height SH satisfying a relationship $0.01 \leq A/SH \leq 0.16$, and a projection amount corresponding to one half of a difference between a total width TW of the tire and a rim width DW of the specified rim being defined as W, and the opening distance A with respect to the projection amount W satisfying a relationship $0.03 \leq A/W \leq 1.60$, wherein an angle $\alpha$ formed by a straight line connecting points P and Q and a horizontal line in the tire width direction is in a range $50° \leq \alpha \leq 80°$, where point P is a point at which a horizontal line in the tire width direction passing through the outermost point of the rim flange in the radial direction intersects with the outer surface of the tire and point Q is a point indicating a rim width and a rim diameter of the specified rim.

2. The tire according to claim 1, wherein the opening distance A is in a range $1.5 \text{ mm} \leq A \leq 8.0 \text{ mm}$.

3. The tire according to claim 1, wherein the opening distance A with respect to a height SDH in a tire radial direction to a maximum width position of the tire satisfies a relationship $0.01 \leq A/SDH \leq 0.50$.

4. The tire according to claim 1, wherein a relationship $55° \leq \alpha \leq 75°$ is satisfied.

5. The tire according to claim 1, wherein a relationship $60° \leq \alpha \leq 70°$ is satisfied.

6. The tire according to claim 1, wherein in an unloaded state where the tire is mounted on the specified rim and inflated to the specified internal pressure, an opening distance between the tire and the rim flange on a perpendicular line drawn from an intermediate point between the outermost point of the rim flange in the radial direction and an opening start point at which the rim flange separates from the tire to the outer surface of the tire is defined as A', and the opening distance A' with respect to the cross-sectional height SH satisfies a relationship $0.006 \leq A'/SH \leq 0.150$.

7. The tire according to claim 6, wherein the opening distance A and the opening distance A' satisfy a relationship $0.50 \leq A'/A \leq 0.96$.

8. The tire according to claim 6, wherein the opening distance A' is in a range $1.0 \text{ mm} \leq A' \leq 7.5 \text{ mm}$.

9. The tire according to claim 1, wherein in a state where the tire is mounted on the specified rim, inflated to the specified internal pressure, and loaded with 100% of specified load capacity, an opening distance between the tire and the rim flange on the perpendicular line drawn from the outermost point of the rim flange in the radial direction to the outer surface of the tire is defined as $A_{100}$, and the opening distance $A_{100}$ with respect to the cross-sectional height SH satisfies a relationship $0.003 \leq A_{100}/SH \leq 0.100$.

10. The tire according to claim 9, wherein the opening distance A and the opening distance $A_{100}$ satisfy a relationship $0.20 \leq A_{100}/A \leq 0.80$.

11. The tire according to claim 9, wherein the opening distance $A_{100}$ with respect to the projection amount W satisfies a relationship $0.010 \leq A_{100}/W \leq 1.000$.

12. The tire according to claim 11, wherein the opening distance A and the opening distance $A_{100}$ satisfy a relationship $0.20 \leq A_{100}/A \leq 0.80$.

13. The tire according to claim 12, wherein the opening distance A is in a range $1.5 \text{ mm} \leq A \leq 8.0 \text{ mm}$.

14. The tire according to claim 13, wherein the opening distance A with respect to a height SDH in a tire radial direction to a maximum width position of the tire satisfies a relationship $0.01 \leq A/SDH \leq 0.50$.

15. The tire according to claim 14, wherein in an unloaded state where the tire is mounted on the specified rim and inflated to the specified internal pressure, an opening distance between the tire and the rim flange on a perpendicular line drawn from an intermediate point between the outermost point of the rim flange in the radial direction and an opening start point at which the rim flange separates from the tire to the outer surface of the tire is defined as A', and the opening distance A' with respect to the cross-sectional height SH satisfies a relationship $0.006 \leq A'/SH \leq 0.150$.

16. The tire according to claim 15, wherein the opening distance A and the opening distance A' satisfy a relationship $0.50 \leq A'/A \leq 0.96$.

17. The tire according to claim 16, wherein the opening distance A' is in a range $1.0 \text{ mm} \leq A' \leq 7.5 \text{ mm}$.

* * * * *